United States Patent [19]
Nichols

[11] Patent Number: 5,913,977
[45] Date of Patent: Jun. 22, 1999

[54] APPARATUS AND METHOD FOR INTERNALLY COATING LIVE GAS PIPE JOINTS OR OTHER DISCONTINUITIES

[75] Inventor: Randall A. Nichols, Manchester, N.H.

[73] Assignee: NEUCO, Inc., Everett, Mass.

[21] Appl. No.: 09/047,837

[22] Filed: Mar. 25, 1998

[51] Int. Cl.[6] ........................... B05C 11/00
[52] U.S. Cl. .................. 118/712; 118/254; 118/306; 118/408; 118/670; 427/236
[58] Field of Search ............... 118/306, 317, 118/318, 712, 713, 105, 254, 408, DIG. 10, 670

[56] References Cited

U.S. PATENT DOCUMENTS

| | | | |
|---|---|---|---|
| 3,885,521 | 5/1975 | Von Arx | 118/112 |
| 4,043,295 | 8/1977 | Speck et al. | 118/317 |
| 4,178,875 | 12/1979 | Moschetti | 118/712 |
| 4,218,989 | 8/1980 | Fujita et al. | 118/317 |
| 4,308,824 | 1/1982 | Muta et al. | 118/408 |
| 4,582,551 | 4/1986 | Parkes et al. | |
| 4,584,963 | 4/1986 | Morinaga et al. | 118/663 |
| 4,627,471 | 12/1986 | Parkes et al. | 138/97 |
| 4,996,940 | 3/1991 | Cleary | 118/306 |
| 5,156,886 | 10/1992 | Kitson | |

*Primary Examiner*—Michael Lusignan
*Assistant Examiner*—Bret Chen
*Attorney, Agent, or Firm*—Mesmer Law Offices, P.A.; Brian C. Dauphin, Esq.

[57] ABSTRACT

Joints or other discontinuities in live gas pipelines are sealed by spraying the joint or discontinuity with a coating material by means of an explosion-proof coating device, capable of traversing long lengths of pipe. The coating device is inserted into the pipe and uses a halogen lit explosion-proof camera for locating joints or other discontinuities in the pipe. The preferred coating material is a high build epoxy-type elastomeric polyurethane, which quickly cures in the presence of pressurized flowing gas. Several joints or discontinuities, spanning several hundred feet of pipe, may be coated using a single excavation.

17 Claims, 6 Drawing Sheets

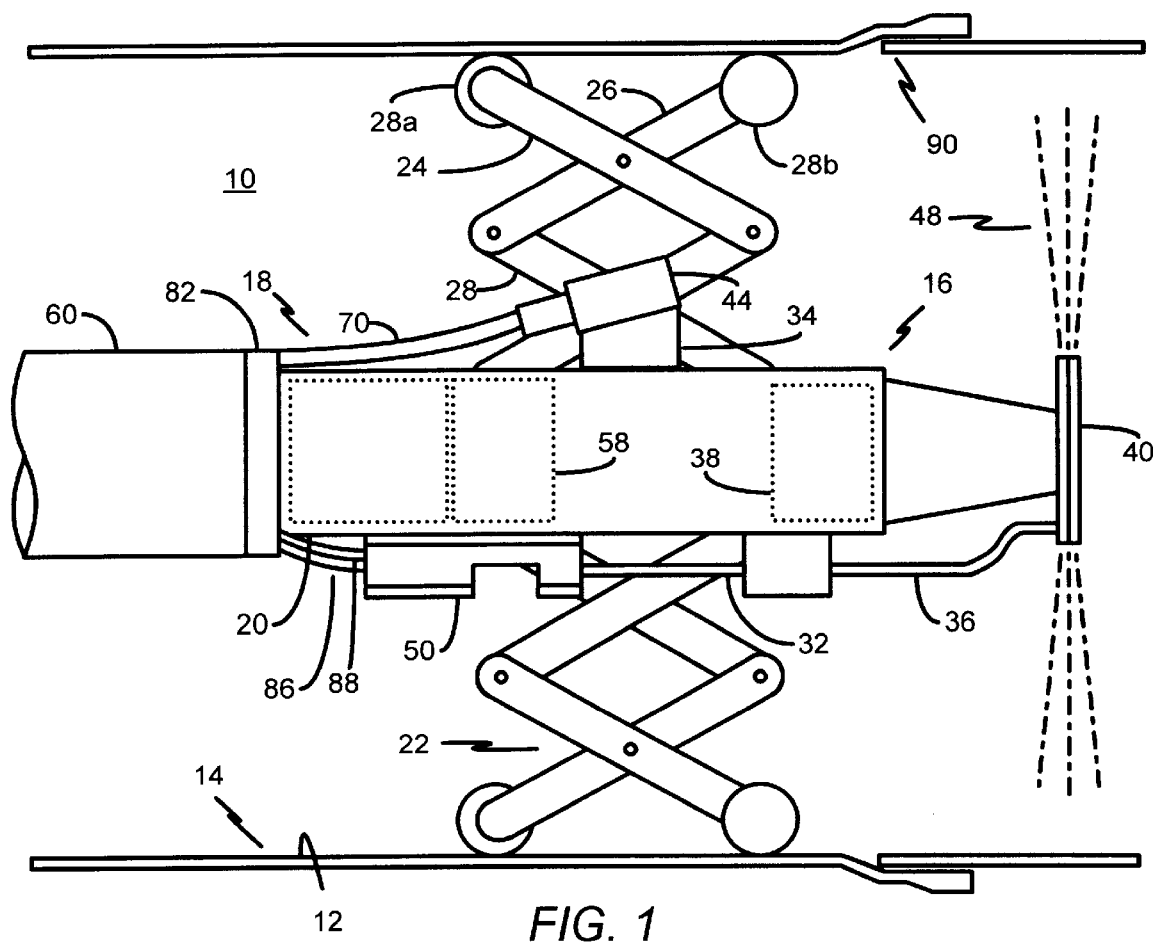
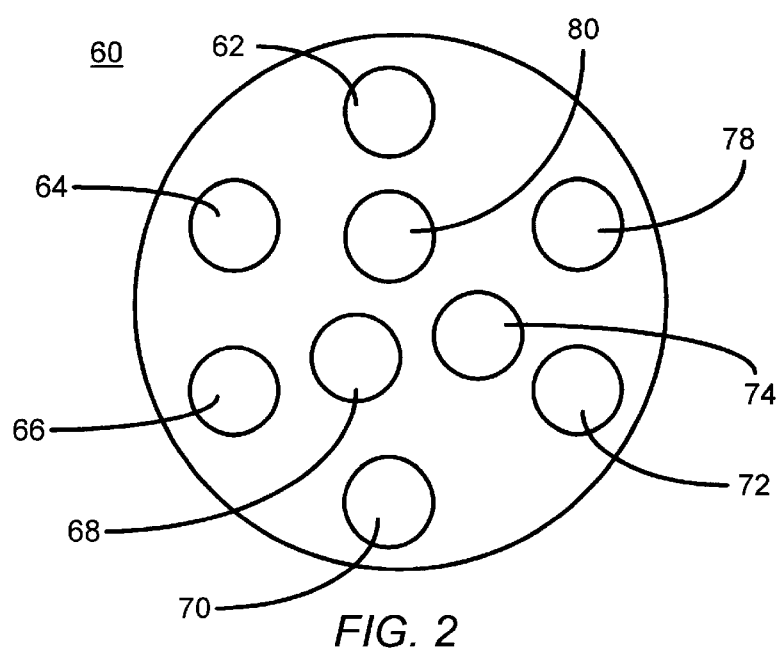

APPARATUS AND METHOD FOR INTERNALLY COATING LIVE GAS PIPE JOINTS OR OTHER DISCONTINUITIES

BACKGROUND OF THE INVENTION

1. Field of the Invention

The present invention relates generally to an apparatus and method for internally coating live gas pipeline or conduit. Particularly, this invention relates to internally coating pipe joints or other discontinuities in live propane or natural gas pipeline. Even more particularly, this invention relates to internally coating pipe joints or other discontinuities in live propane or natural gas pipeline using a self-aligning, explosion-proof coating device capable of coating several hundred feet of live underground gas pipeline while requiring only a single excavation.

2. Description of the Related Art

A dilemma has arisen in the gas and gas transportation industry. Low-moisture gas, such as propane or natural gas, has replaced high-moisture manufactured gas, such as coal gas, as a source of domestic and industrial fuel. Traditionally and for many decades coal or other high-moisture gases were fed to customers by underground pipes. Typically these gas pipelines were constructed of individual lengths of pig or cast iron pipe. These individual lengths of pipe were commonly joined together by bell or lap joints that were sealed with a combination of a filler material and lead. Several different types of filler material were used including horsehair, yarn, jute and hemp. It was discovered that, as many municipalities converted from high-moisture manufactured gas to the relatively low-moisture propane or natural gas, the filler material in the pipe joints would dry out. As these filler materials dried out they would decompose and disintegrate, thereby causing gas leaks to appear at the pipe joints.

The decay of joint filler due to the conversion to low-moisture gas is not unique to the United States. The United Kingdom is experiencing similar decay of their gas pipe joint filler. As a preventative measure, and as an attempt to slow down the decay of filler material, many gas companies in the United Kingdom, and a few in the United States, routinely "fog" their gas lines. Fogging normally involves sending a glycol type product through the gas pipeline to enhance the moisture content of the filler. Another method of maintaining high moisture in the filler involves a process known in the gas industry as humidification. This process requires repeated application of pressurized steam to a gas pipe system.

Unfortunately, these preventative procedures are only temporary and can be quite costly. Today, to adequately prevent gas from escaping these types of pipelines, the pipe joints or other discontinuities must be sealed or replaced. Because many of these pipelines are underground and not readily accessible, excavating, removing and replacing an entire length of pipeline having deteriorated pipe joints is drastic and quite costly.

One method of sealing these pipe joints or discontinuities against gas leaks includes excavating an end of the pipe and having someone climb into the pipe to hand apply a coating compound. This method can be quite expensive and time consuming. Also, this method can be dangerous and is unfeasible for small diameter pipe. Another technique includes inserting a permanent lining throughout the entire length of pipe. Again this is quite costly and may cause an unacceptable reduction in the flow capacity of the pipe. Also, this method requires a large consumption of natural resources to fabricate a lining for an entire length of pipe, when typically only the joints are susceptible to leaking.

Still another method, such as U.S. Pat. No. 4,178,875 (1979, Moschetti) includes sending a device through the pipe that can remotely detect a joint or other discontinuity that needs repair. A coating material is then sent through attached tubing and is sprayed onto the inner surface of the pipe at the desired location. However, this and the above-mentioned methods are not performed on "live gas pipe" (pipe in which pressurized gas remains flowing). These methods require the gas flow to be shut down for long periods of time. Depending on the customers being serviced by the gas line, it is normally unacceptable to interrupt service for such long periods of time. Another disadvantage of these methods is that they require more than a single excavation when coating long lengths of pipeline.

Still other methods are known whereby the gas remains live while coating, repairing or sealing is accomplished. U.S. Pat. Nos. 4,582,551 and 4,627,471 (1986, Parkes et al.) disclose a method and device that can remotely seal joints or leaks in a pipe while the gas continues flowing in the pipe. The device is inserted into a pipe whose inner diameter is slightly larger than the outer circumference of the device. The device uses expandable bladders to form a substantially air-free environment, thereby isolating the joint or discontinuity from pressurized gas. The pressurized gas is rerouted through the interior of the device. Anaerobic sealant is then pumped to the device and the sealant is sprayed onto the interior of the pipe at the desired location. The device remains in place long enough to allow the anaerobic sealant to setup. A disadvantage with this device is that it requires an environment free from air and flowing pressurized gas in which to apply sealant. Another disadvantage with these types of devices is that they are limited in their ability to maneuver around corners or other obstacles in the pipeline as they are in close proximity to the interior of the pipe. Still another disadvantage with these devices is that they are slow and time consuming because they require the device to remain in place while the sealant sets.

Another method of sealing pipe joints in a live gas pipe is taught in U.S. Pat. No. 5,156,886 (1992, Kitson). This method involves inserting a nozzle attached to a hose through a tapping mandrel to a desired location in a live gas pipe, whereby an anaerobic sealant is pumped through the hose to the nozzle. The nozzle sprays the anaerobic sealant onto the interior of the pipe. This method works well on relatively short lengths of pipe. However, as the length of tubing increases, the viscosity of the anaerobic sealant prevents it from reaching the spraying device in adequate quantities. Also, as the length of tubing increases, static electric charges build up in the line due to the friction caused by the sealant rubbing against the interior of the tubing. This can pose serious problems when working in a live gas setting. Another drawback with this device is that the anaerobic sealant tends to pool in the bottom of the pipe upon application. An additional drawback of this method is that it typically requires the presence of some filler to properly seal a leaking joint. Because the above-mentioned preventative or fogging measures were never routinely performed in the United States, much of the filler in United States gas pipe joints has disintegrated, making this method of sealing pipe joints impractical.

What is needed is an apparatus and method for coating or sealing the interior of very long lengths of underground pipe or other conduit, either at a joint, another type of discontinuity or along the entire length of the pipe, while the gas in the pipe remains live. What is also needed is an apparatus and method of internally coating live gas pipe joints that do not require the presence of filler material in a joint to efficiently seal it. What is further needed is an apparatus and method that allow for several layers of coating material to be applied at the same site, that provide a rapid coating process, that do not require the coating device to remain in place while the coating material sets, that can be inserted into a live gas pipe using a variety of means, that can maneuver around bends and other obstacles normally found in gas pipe, and that can be safely operable in live gas settings. Finally, what is needed is an apparatus and method that applies an epoxy-type sealant that will coat the interior of a variety of different pipe surfaces, with or without the presence of pressurized gas, with or without the presence of air or oxygen and that will not produce significant pooling of the coating material in the bottom of the pipe upon application.

SUMMARY OF THE INVENTION

It is therefor an object of the present invention to provide an apparatus and method for coating or sealing the interior of very long lengths of underground pipe or other conduit, either at a joint, another type of discontinuity or along the entire length of the pipe, while the gas in the pipe remains live.

It is another object of the present invention to provide a method and apparatus that does not require the presence of filler material to efficiently seal a joint or other discontinuity.

It is still another object of the present invention to allow for several layers of coating material to be applied at the same site.

It is a further object of the present invention to provide a rapid coating process, which does not require the coating device to remain in place while the coating material sets.

It is a further object of the present invention that it can be inserted into a live gas pipe using a variety of methods.

It is a further object of the present invention that it can maneuver around bends and other obstacles normally found in gas pipe.

It is still a further object of the present invention that it be safely operable in live gas settings.

It is still a further object of the present invention that it applies an epoxy-type sealant that will coat the interior of a variety of different pipe surfaces, with or without the presence of pressurized gas, with or without the presence of air or oxygen and that will not pool in the bottom of the pipe upon application.

It is still a further object of the present invention that it requires only a single excavation to repair several hundred feet of live underground pipe.

These objects are achieved by providing an apparatus and a method for coating or sealing the interior of underground pipes where the apparatus is moved through the pipe while the gas is flowing. The coating device is connected to reservoirs of coating material and is specially designed to operate in the presence of propane or natural gas without incident. In addition, an epoxy-type coating material is utilized that will adhere to a variety of surfaces and that will set-up within a variety of climates, including a pressurized live gas environment.

To prevent electric discharge caused by friction, resulting from the individual components of coating material traveling to the coating device, the coating material components are pumped to the coating device through a series of non-conductive or electrically grounded tubing. This makes the device safer to operate in a live gas environments.

The present invention also includes scissor-type expansion legs. These scissor-type legs allow the present invention to maneuver around corners and bends in the pipe, and to adapt to a wide variety of pipe diameters. Also, the combination of a non-conductive or electrically grounded delivery system with a specially designed pushing system, allow greater lengths of pipe to be sealed or repaired with fewer excavations than known related art devices and techniques.

As thousands of miles of these types of pipe deteriorate all over the United States and the rest of the World, and because the present invention allows several hundred feet of underground pipe to be coated or repaired using a single excavation, the required number of excavations needed to repair the deteriorating pipe and pipe joints will be greatly reduced. Therefore, the energy and natural resources required to restore the excavated repair sites will also be greatly reduced. In addition, the present invention will provide an economically feasible method of repair that allows indefinite postponement of the replacement of thousands of miles of gas pipeline, thereby preserving the enormous quantities of natural resources that would be required to fabricate replacement pipe. As many of these pipe joints and other discontinuities are sealed, the loss of natural or propane gas will be greatly reduced, as will the consumption of enormous amounts of glycol and other joint filler preserving compounds.

BRIEF DESCRIPTION OF THE DRAWINGS

FIG. 1 is a detailed side view of the coating device and the semi-flexible containment tube of the present invention showing the device situated inside a section of gas pipe.

FIG. 2 is a cross-sectional view of the containment tube of the present invention showing the different dedicated hoses, rods and tubes required for operation of the coating device shown in FIG. 1.

DETAILED DESCRIPTION OF THE PREFERRED EMBODIMENT

Figure 3:
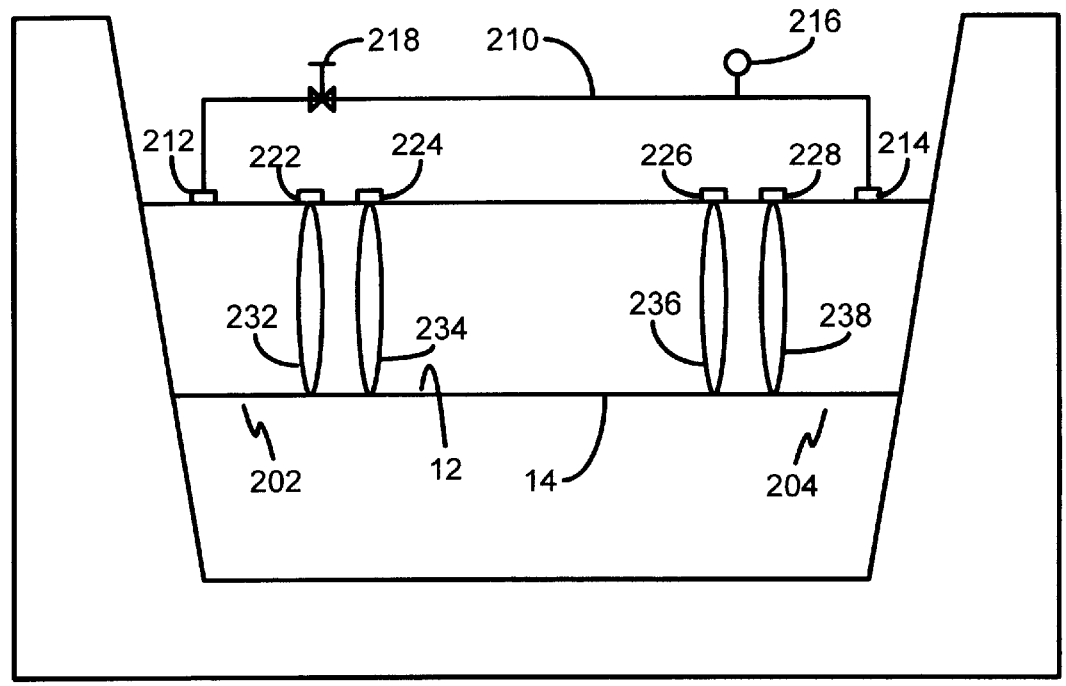
FIG. 3 is a schematic view of an excavation site showing an exposed length of gas pipe and a bypass system that allows the gas to remain flowing in the pipe.
Figure 4:
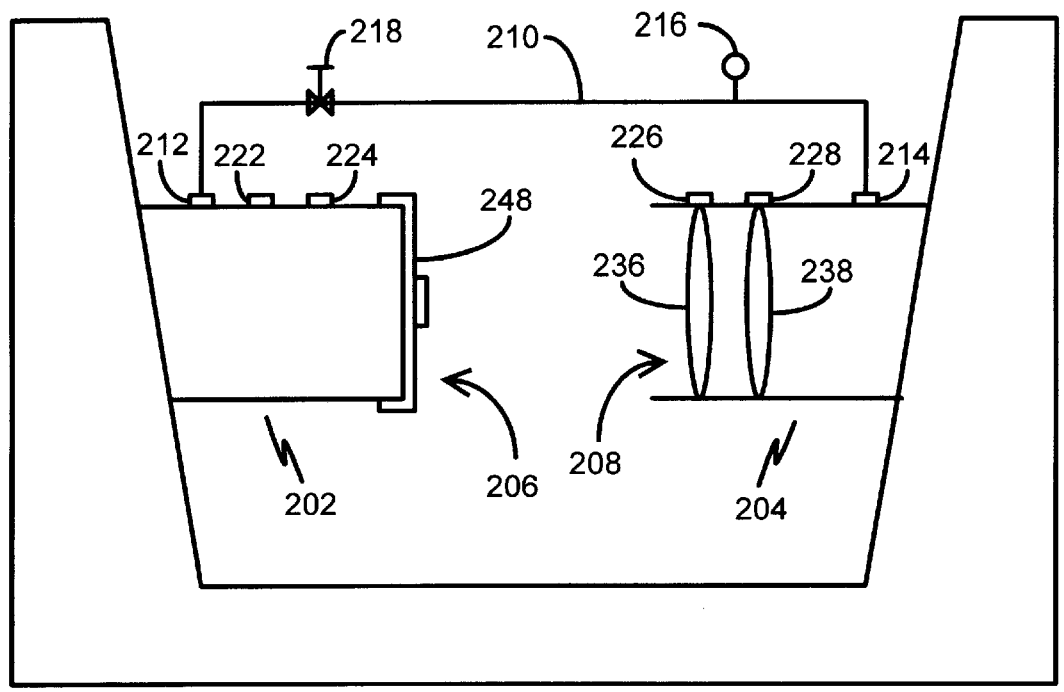
FIG. 4 is a schematic view of an excavation site showing a section of gas pipe removed and an end cap placed on an exposed end and a gas bypass system that allows the gas to remain flowing in the pipe.
Figure 5:
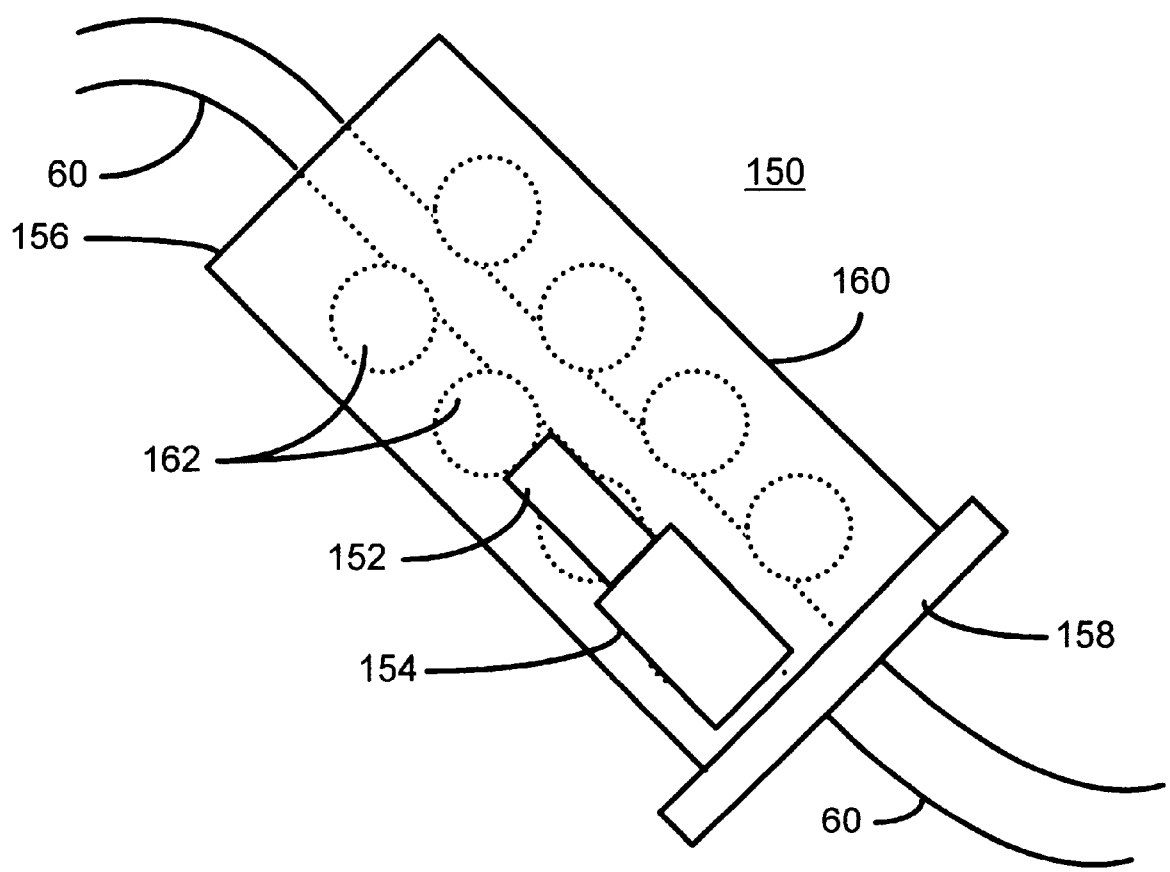
FIG. 5 is a side view of a containment tube pushing unit of the present invention.

The preferred embodiment of the present invention is illustrated in FIGS. 1–11. Referring now to FIG. 1, a coating device, generally designated by numeral 10, is shown located resting on an inside surface 12 of a pipe 14. The coating device 10 is provided with a centering carriage 20. The centering carriage 20 has a front end 16 and a rear end 18. A manifold 82 is attached to the rear end 18. A containment tube 60 is shown attached to manifold 82. An air motor 38 is mounted inside the front end 16 of centering carriage 20. Air motor 38 turns a rotating slotted head 40. A static mixer 50 is fixed to the side of centering carriage 20. Individual coating material components are sent to the static mixer 50 through intake tubes 86 and 88 where they are thoroughly mixed to produce a coating material 48. The coating material 48 is then sent through an outlet tube 32 where it is forced into a spray tip 36. Spray tip 36 then meters an appropriate amount of coating material 48 into rotating slotted head 40, which centrifugally disperses coating material 48 onto the inside surface 12 of pipe 14.

The centering carriage 20 is provided with a plurality of adjustable-length scissor-type expansion legs 22 for support. Each scissor-type expansion leg 22 is attached to a compressed gas powered piston 58, which is mounted inside the rear end 18 of centering carriage 20. Wheel assemblies **28*a* and 28*b* are attached to the ends of the adjustable-length scissor-type expansion legs 22. The wheel assemblies 28*a* and 28*b* are shown in contact with the inside surface 12 and allow for lateral movement of coating device 10 through pipe 14. The scissor-type expansion legs 22 are shown having four hinged members 24, 26, 28, and 30. The number of hinged members may be increased or decreased to accommodate different diameters of pipe 14**.

An illuminating explosion-proof monitoring camera probe 44 is attached to centering carriage 20, by way of a monitoring probe mount 34. An explosion-proof camera probe cable 70 is attached at one end to the illuminating explosion-proof monitoring camera probe 44 and at the other end to a control console. The illuminating explosion-proof monitoring camera probe 44, which is powered by the explosion-proof camera probe cable 70, is positioned to allow an operator to locate sections of pipe 14 that require treatment by the coating device 10. The explosion-proof monitoring camera probe 44 lights the inside surface 12 of pipe 14, and relays images of the inside surface 12 back to the control console.

As the coating device 10 is progressed laterally through pipe 14 an operator is able to monitor joints or other discontinuities by viewing a monitor on the control console. The operator can remotely control the application of coating material 48 to the inside surface 12 of pipe 14. Upon discovery of a joint or discontinuity, a specific amount of coating material 48 is metered onto inside surface 12.

The preferred coating material 48 is two-part epoxy-type elastomeric polyurethane sold under the name PLASITE PERMA-THANE 2300. Coating material 48 is capable of filling and coating large joints or other discontinuities. Coating material 48 can be used in a variety of environments including pressurized gas, air or oxygen. Depending upon the desired thickness of coating material 48 required, an operator can reposition coating device 10 and repeat the coating process described above.

Referring now to FIG. 2, a cross-sectional view of containment tube 60 is shown. Containment tube 60 houses non-conductive sealant component hoses 62 and 64, compressed gas hoses 66, 68 and 78, sealed explosion-proof camera probe cable 70, exhaust hoses 72 and 74, and an optional flexible stabilizing rod 80. Containment tube 60 serves to protect the various hoses, tubes and rods it surrounds from abrasion. Also, containment tube 60 is flexible enough to maneuver around tight corners and bends in pipe, and is rigid enough to provide for the lateral movement of the coating device 10 in long lengths of pipe. Additionally, containment tube 60 serves to exhaust the gas used to power the air motor 38 and operate the scissor-type expansion legs 22 outside pipe 14.

The non-conductive sealant component hoses 62 and 64 provide the individual coating material components to the intake tubes 86 and 88, respectively. The compressed gas hose 66 provides compressed gas for manipulating piston 58 which controls the expansion and contraction of the scissor-type expansion legs 22. Compressed gas hose 68 is used for powering air motor 38, which in turn powers slotted spray head 40. The sealed explosion-proof probe cable 70 is used for powering, lighting and receiving information from explosion-proof monitoring probe 44. Exhaust hose 72 exhausts the compressed and other gases outside pipe 14. Compressed gas hose 78 supplies compressed gas for purging any unused sealant 48 from the coating device 10. The optional flexible stabilizing rod 80 provides for additional rigidity within containment tube 60 and allows for additional lateral force to be applied to the coating device 10.

Referring now to FIG. 3, a schematic view of an excavated section of live gas pipe 14, having a first section 202 and a second section 204 is shown. Tap holes 212 and 214 are drilled in sections 202 and 204 respectively. Next a temporary bypass 210 is connected between drilled holes 212 and 214 to allow the gas to remain flowing in pipe 14 while a section is removed to allow for the insertion of coating device 10. The temporary by-pass 210 is equipped with a pressure gauge 216 and a shut-off valve 218.

Holes 222 and 224 are drilled, tapped and plugged in section 202 and holes 226 and 228 are drilled, tapped and plugged in section 204 of the excavated section of live gas pipe 14, between the drilled holes 212 and 214. The plugs are then removed from the drilled holes 222, 224, 226 and 228, and inflatable bladders 232, 234, 236 and 238 are inserted through the drill holes 222, 224, 226 and 228 respectively.

Inflatable bladders 232 through 238 are inflated to create a gas impermeable seal within pipe 14. Depending upon the pressure and the direction of the gas flowing in pipe 14, fewer or additional inflatable bladders may be employed to control the flow of gas in pipe 14. Opening the shut-off valve 218 diverts the flow of gas in pipe 14 through the temporary by-pass 210. With inflatable bladders 232, 224, 226 and 238 still inflated, a length of pipe located between inflatable bladders 234 and 236 is removed.

Referring now to FIG. 4, the now exposed end 206 of section 202 is shown sealed off with cap 248. Inflatable bladders 232 and 234 may then be removed without allowing gas to escape from pipe 14. The gas in pipe 14 continues to flow through temporary by-pass 210.

Referring now to FIG. 5 a pushing unit 150 is shown. FIG. 5 shows pushing unit 150 having a first end 156, a second end 158, and an outside surface 160. Pushing unit 150 controls the movement of containment tube 60 in pipe 14, which in turn controls the lateral movement of coating device 10. A power mechanism 154 is attached to outside surface 160. A control mechanism 152 is operatively connected to power mechanism 154 and controls the rate at which power mechanism 154 operates. Containment tube 60 is shown entering pushing unit 150 through first end 156 and exiting pushing unit 150 through second end 158. A plurality of flywheels 162 are powered by power mechanism 154 and operate to maneuver containment tube 60 through pushing unit 150 and into and out of pipe 14.

Figure 6:
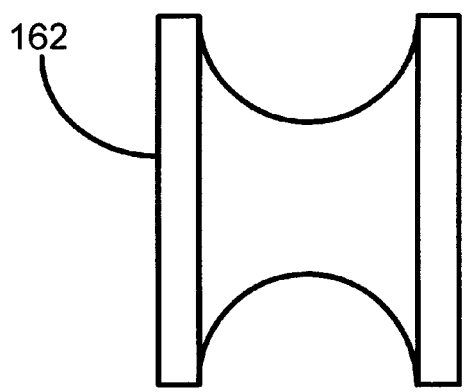
FIG. 6 is an enlarged side view of a flywheel from the containment tube pushing unit shown in FIG. 5.

FIG. 6 shows an enlarged side view of a single flywheel 162, having a curved inner surface for receiving containment tube 60.

Figure 7:
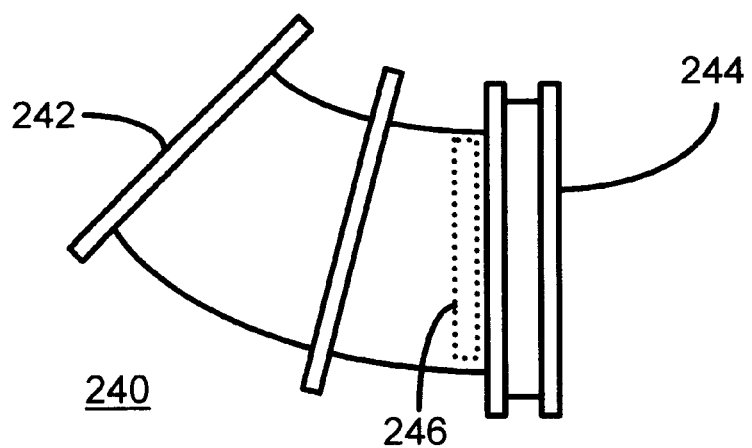
FIG. 7 is a side view of an entry unit of the present invention.

Referring now to FIG. 7 a side view of a preferred insertion duct 240 is shown. Insertion duct 240 has a first end 242 and a second end 244. Insertion duct 240 is fitted with a gate-valve 246 in second end 244. Gate valve 246 closes to form a gas impermeable seal about containment tube 60, which permits containment tube 60 to pass through it while preventing gas from escaping from pipe 14. Insertion duct 240 is shown having a preferred curve shape. This design facilitates the insertion of containment tube 60 and coating device 10 into pipe 14 and allows for a smaller section of pipe 14 to be removed. A straight or other shaped insertion duct may also be used.

Figure 8:
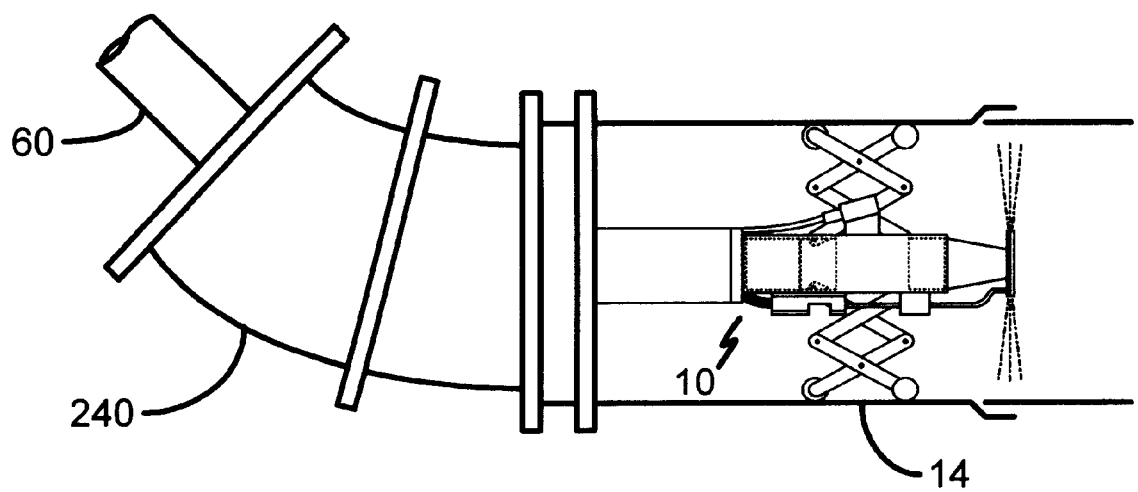
FIG. 8 shows the entry unit as shown in FIG. 7 attached to a gas pipe with a coating apparatus of the present invention resting within the gas pipe.

Referring now to FIG. 8 insertion duct 240 is shown attached to a section of gas pipe 14. Coating apparatus 10, as shown in FIG. 1, is shown situated in pipe 14.

Figure 9:
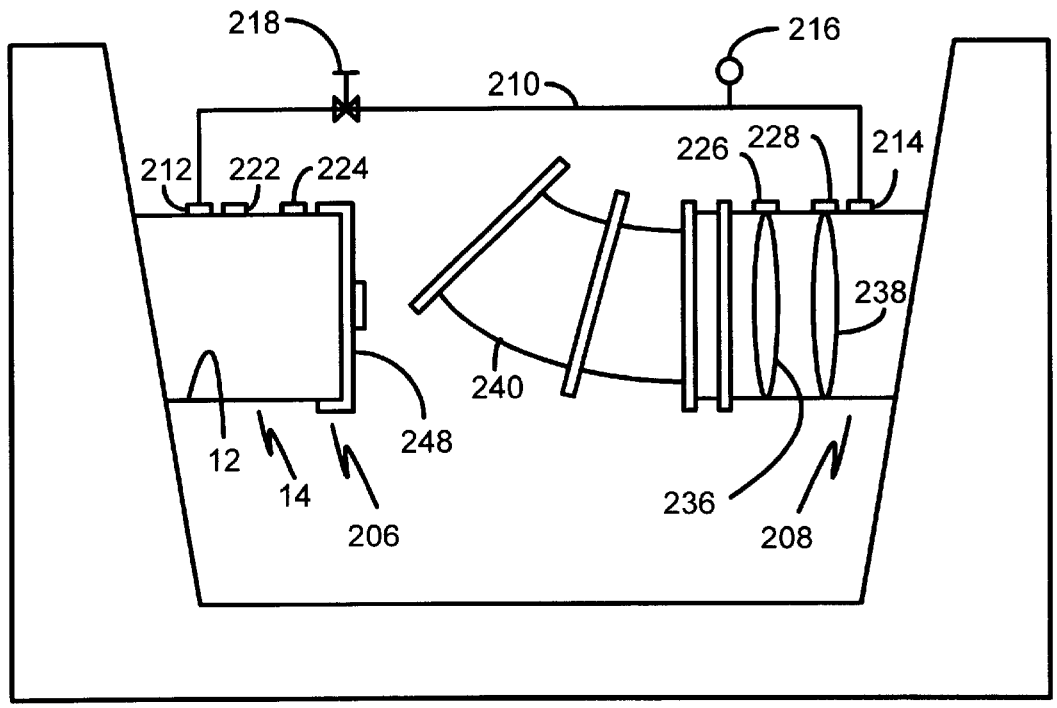
FIG. 9 is a schematic view of an excavation site showing the entry unit shown in FIG. 7 attached to an exposed end of gas pipe.

Referring now to FIG. 9, second end 244, of insertion duct 240, is shown bolted or otherwise fastened to the now exposed end 208 of pipe 14.

Figure 10:
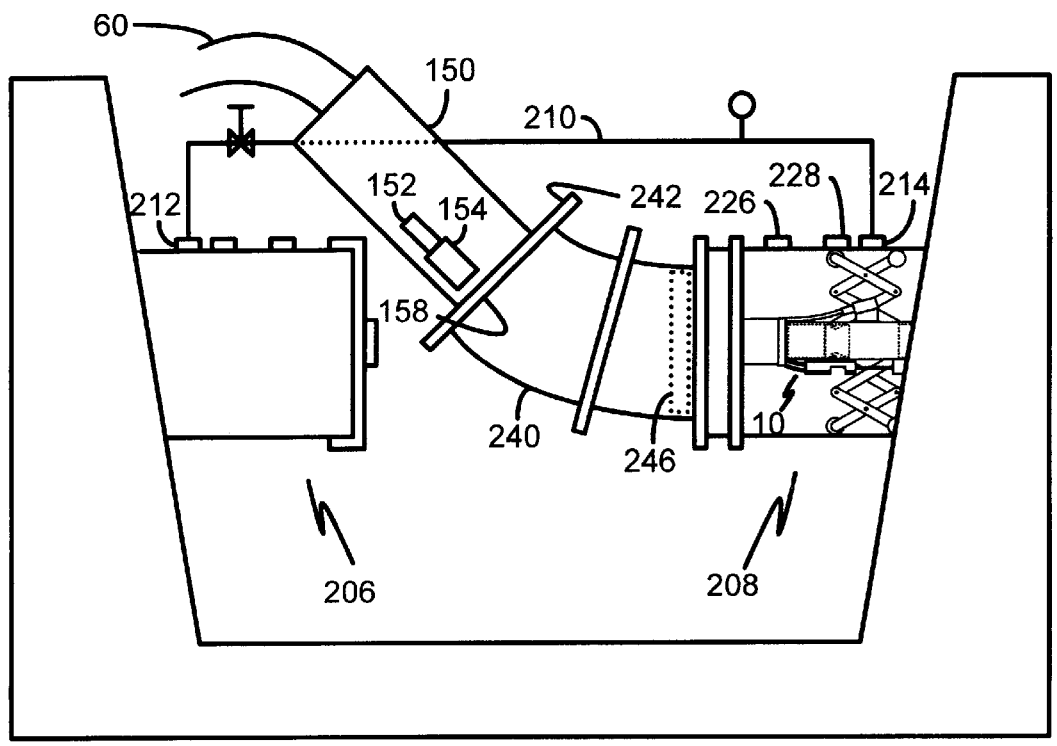
FIG. 10 is a schematic view of an excavation site showing the containment tube pushing unit shown in FIG. 5 attached to the entry unit as shown in FIG. 7.

Referring now to FIG. 10, second end 158, of pushing unit 150, is shown attached to first end 242 of insertion duct 240. Prior to bolting or otherwise fastening pushing unit 150 to insertion duct 240, containment tube 60 is inserted through pushing unit 150 and attached to coating device 10. Coating device 10, attached to containment tube 60, is then inserted into first end 242 of insertion duct 240, through gate-valve 246 and into pipe 14. Second end 158 of pushing unit 150 is then secured to first end 242 of insertion duct 240. After pushing unit 150 is secured to insertion duct 240 inflatable bladders 236 and 238 are deflated and removed and drill holes 226 and 228 are plugged.

An operator can then laterally relocate coating device 10 hundreds of feet down pipe 14 away from section 204 to a desired location with control unit 152. Control unit 152 adjusts the rate of speed of power mechanism 154, which in turn controls the speed of flywheels 162. Flywheels 162 feed containment tube 60 into pipe 14, which laterally moves coating device 10. The operator can then monitor the inside surface 12 of pipe 14 using the images sent back along explosion-proof camera probe cable 70 from the explosion-proof monitoring camera probe 44.

Once a joint or other discontinuity has been located the operator may then remotely apply coating material 48. The operator controls the thickness of coating material applied to inside surface 12 by controlling both the rate of lateral movement of coating device 10 and by controlling the flow rate of the individual sealant components. When the operator has finished coating and sealing a section of pipe 14 with coating material 48, the static mixer 50, the spray tip 36, the outlet tube 32 and the rotating slotted head 40 may be purged of coating material 48 by forced compressed gas provided by compressed gas purging line 78.

Once the desired length of pipe 14 leading away from section 204 is sealed, pushing unit 150, insertion duct 240 and coating device 10 are removed in reverse order as above-described and an end cap 248 is placed over exposed end 208.

To seal the length of pipe 14, leading away from exposed end 202, drill holes 236 and 238 are unplugged and inflatable bladders 236 and 238 are reinserted and inflated. End cap 248 is removed from section 202 of pipe 14 and insertion duct 240 is mounted to exposed end 206 in its place. Coating apparatus 10 is then inserted into section 202 and pushing unit 150 is attached to insertion duct 240. The inspection and treating procedure is the same as described above.

Figure 11:
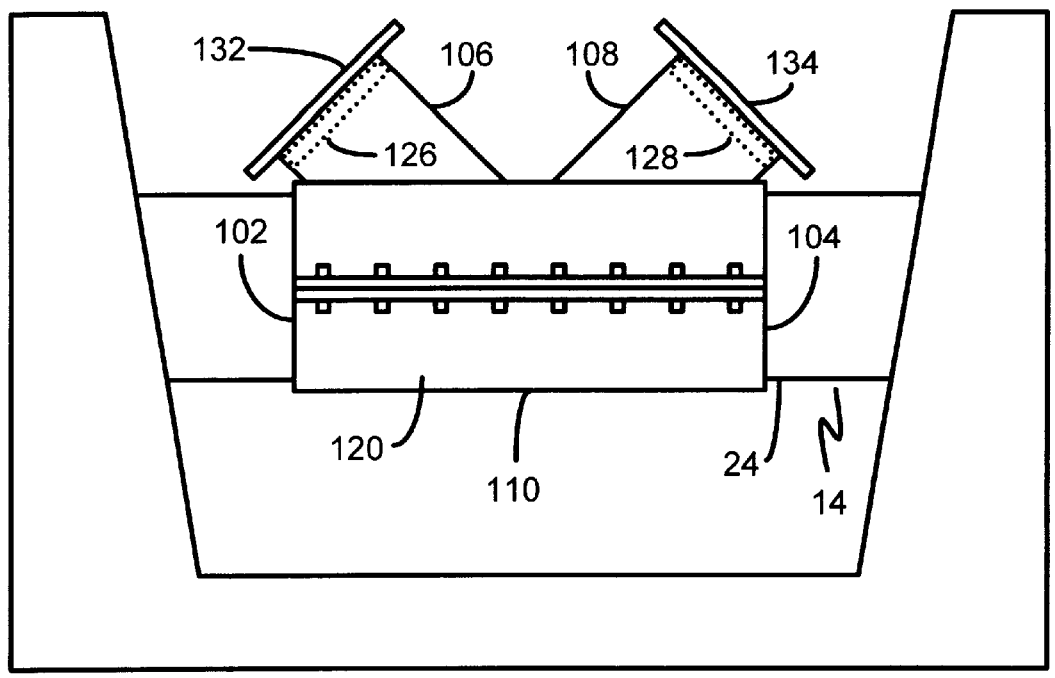
FIG. 11 is a schematic view of an excavation site showing a split sleeve dresser entry unit of the present invention attached to a gas pipe.
Figure 12:
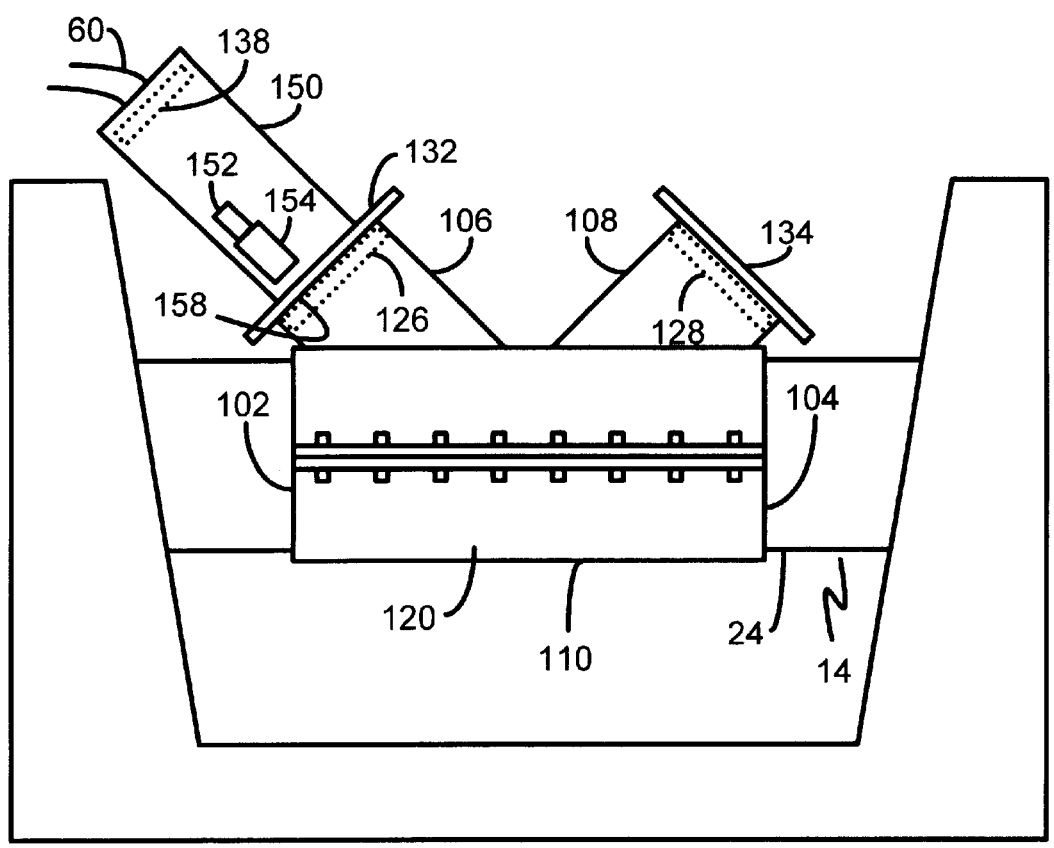
FIG. 12 is a schematic view of an excavation site showing the containment tube pushing unit shown in FIG. 5 attached to the split sleeve dresser shown if FIG. 11.

Referring now to FIGS. 11 and 12, a second method is revealed for inserting coating device 10 into live gas pipe 14. FIG. 11 depicts an excavated section of live gas pipe 14. A two-piece split-sleeve dresser 110, having a first end 102 and a second end 104, is put in place and bolted around the outer circumference 24 of a section of live gas pipe 14. Angled sections 106 and 108, containing gate valves 126 and 128 respectively, are then attached to an outer surface 120 of the split-sleeve dresser 110.

FIG. 12 shows pushing unit 150 attached to angled section 106. Pushing unit 150 controls the lateral movement of coating device 10 in the same manner as described above. Once the desired length of pipe 14 has been treated and inspected using coating device 10 it may be removed from pipe 14.

Prior to the attachment of pushing unit 150, a drilling unit is mounted to a faceplate 132 of angled section 106. Gate valve 126, located within angled unit 106, is opened as the drilling unit drills a hole 142 (not shown) through the two-piece split-sleeve dresser 110 and into pipe 14, at the point where angled section 106 and split sleeve dresser 110 intersect. Hole 142 is large enough to allow coating device 10, attached to containment tube 60, to be inserted into pipe 14. Gate valve 126 is then closed and the drilling unit is removed.

Containment tube 60 is threaded through pushing unit 150 and attached to coating device 10. Coating device 10 is then inserted into angled section 106. Second end 158 of pushing unit 150 is then bolted or otherwise fastened to face plate 132 of angled section 106. An inflatable packing gland 138 is then inserted into pushing unit 150 and is positioned around containment tube 60, to form a gas impermeable seal. Inflatable packing gland 138 prevents gas from escaping pipe 14 while allowing containment tube 60 to pass through hole 142 into pipe 14. Once inflatable packing gland 138 is in place, gate valve 126 is opened and coating device 10 is pushed through hole 142 and into pipe 14.

A length of gas pipe section leading away from split sleeve dresser end 104, may be inspected and treated in the same manner as described above. First, an operator relocates the coating device 10 the desired distance down pipe 14. The operator then maneuvers the coating device 10 back to the split sleeve dresser 110 inspecting and coating joints or other discontinuities along the way. After the section of pipe leading away from split sleeve dresser end 104 has been treated, the coating device 10 is returned to angled section 106. Gate valve 126 is closed and the pushing unit 150 is removed. A cap 136 (not shown) is then bolted or otherwise fastened to face plate 132.

In order to inspect and treat the section of gas pipe extending away from split sleeve dresser end 102, a hole 144 (not shown) similar to hole 142, is cut into pipe 14, within angled section 108 and through the two-piece split-sleeve dresser 110. Hole 144 is large enough to allow coating device 10, attached to containment tube 60, to be inserted into pipe 14. Coating device 10 is then inserted through angled section 108 through hole 144 and into pipe 14. After the section of gas pipe extending away from split sleeve dresser end 102 has been inspected and treated, and coating device 10 has been removed, a cap 146 (not shown) is secured to face plated 134. After both sections of pipe 14, leading away from the split sleeve dresser 110 have been inspected and treated, and angled sections 106 and 108 have been capped, the split sleeve dresser 110 is left in place and the excavation is filled in.

Depending upon the amount of build up of debris on inside surface 12 of pipe 14, a cleaning device may be attached to containment tube 60 and fed through pipe 14 using the same methods as described above. Preferred cleaning devices are self-centering, powered by compressed air, explosion proof and propel an abrasive at the inside surface 12. The abrasive effectively and efficiently reconditions the inside surface 12. After reconditioning, the cleaning device is removed to allow for the insertion of coating device 10.

What is claimed is:

1. A system for internally coating a joint or other discontinuity in a live gas pipeline comprising:
   (a) an entry unit having an orifice, wherein said entry unit is operatively connected to a pipeline;
   (b) a flexible conduit slidingly engaged with said orifice of said entry unit;
   (c) a propulsion unit removably connected to said flexible conduit for propelling said flexible conduit through said pipeline; and
   (d) a coating unit removably connected to said flexible conduit, wherein said coating unit applies an adhesive material to an interior surface of said pipeline in the presence of a pressurized gas.

2. The system as claimed in claim 1 wherein said entry unit is a split sleeve dresser having at least one entry port.

3. The system as claimed in claim 1 wherein said entry unit is a gate valve.

4. The system as claimed in claim 1 wherein said entry unit is a curved conduit having a gate valve.

5. The system as claimed in claim 1 wherein said propulsion unit comprises:
   (a) a first end and a second end, an inner surface and an outer surface;
   (b) a motor removably connected to said outer surface;
   (c) a control device operatively connected to said motor; and
   (d) a plurality of flywheels engagedly powered by said motor, wherein said flywheels tangentially engage said flexible conduit so as to produce and control lateral movement of said conduit.

6. The system as claimed in claim 1 wherein said flexible conduit is a hollow containment tube having a plurality of dedicated conduits.

7. The system as claimed in claim 1 wherein said coating unit comprises:
   (a) a carriage having a first end and a second end;
   (b) a spraying mechanism detachably connected to said first end of said carriage; and
   (c) a plurality of adjustable legs, each having a first end and a second end, said first end slidably connected to said carriage.

8. The system as claimed in claim 7 wherein said coating unit further comprising:
   (a) rolling members rotatably connected to said second end of said adjustable legs; and
   (b) a monitoring device detachably connected to said centering carriage.

9. The system as claimed in claim 8 wherein said monitoring device is a sealed explosion-proof camera probe.

10. The system as claimed in claim 1 further comprising an adhesive material, which is applied to the interior of a gas pipe by said coating unit.

11. The system as claimed in claim 10 wherein said adhesive material hardens in a gas environment and wherein said hardened material is substantially impervious to said gas.

12. The system as claimed in claim 10 wherein said adhesive material hardens in a gas free environment.

13. The system as claimed in claim 10 wherein said adhesive material hardens in an oxygen rich environment.

14. The system as claimed in claim 10 wherein said adhesive material hardens in an oxygen free environment.

15. The system as claimed in claim 10 wherein said adhesive material is a polyoxyethylene polypropylene polymer.

16. The method as claimed in claim 10 wherein said adhesive material is an elastomeric polyurethane.

17. The system as claimed in claim 1 wherein said propulsion unit is removably connected to said entry unit.

\* \* \* \* \*